(12) United States Patent
Ganganna

(10) Patent No.: US 8,712,033 B2
(45) Date of Patent: *Apr. 29, 2014

(54) METHOD AND SYSTEM FOR PROVIDING INTELLIGENT CALL REJECTION AND CALL ROLLOVER IN A DATA NETWORK

(75) Inventor: Basavaraju Ganganna, Broken Arrow, OK (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1051 days.

This patent is subject to a terminal disclaimer.

(21) Appl. No.: 11/760,419

(22) Filed: Jun. 8, 2007

(65) Prior Publication Data

US 2008/0304470 A1 Dec. 11, 2008

(51) Int. Cl.
*H04L 12/66* (2006.01)
*H04M 1/64* (2006.01)
*H04M 3/42* (2006.01)

(52) U.S. Cl.
USPC ...... 379/352; 379/70; 379/88.25; 379/211.02

(58) Field of Classification Search
USPC ............ 379/201.01, 215.01, 67.1, 68, 70, 76, 379/81, 88.22, 88.25, 211.01, 211.02, 379/212.01, 142.01; 370/352
See application file for complete search history.

(56) References Cited

U.S. PATENT DOCUMENTS

| | | | |
|---|---|---|---|
| 6,018,671 A * | 1/2000 | Bremer | 455/567 |
| 6,047,057 A * | 4/2000 | Weishut et al. | 379/215.01 |
| 6,724,872 B1 | 4/2004 | Moore et al. | |
| 7,587,039 B1 | 9/2009 | Koch | |
| 7,957,515 B1 | 6/2011 | Weiss | |
| 8,081,745 B2 | 12/2011 | Burrell et al. | |
| 2002/0146105 A1* | 10/2002 | McIntyre | 379/211.02 |
| 2004/0203794 A1* | 10/2004 | Brown et al. | 455/445 |
| 2004/0213396 A1* | 10/2004 | MacNamara et al. | 379/210.02 |
| 2005/0123118 A1* | 6/2005 | Terry et al. | 379/211.02 |
| 2005/0180407 A1* | 8/2005 | Kim | 370/356 |
| 2005/0243987 A1* | 11/2005 | Polouchkine et al. | 379/201.01 |
| 2006/0098792 A1 | 5/2006 | Frank et al. | |
| 2007/0047529 A1* | 3/2007 | Ricciardi et al. | 370/356 |

FOREIGN PATENT DOCUMENTS

WO    WO 2008005924 A2 *   1/2008    ............ H04M 3/533

* cited by examiner

*Primary Examiner* — Oleg Asanbayev

(57) ABSTRACT

A system and method may include receiving an invite message associated with a calling device over a data network, the invite message requesting establishment of a voice over data communication session, and presenting a plurality of call rejection options, each of the plurality of call rejection options being associated with separate call rejection messages. The system and method may further include determining which one of the plurality of call rejection options is selected, where the plurality of call rejection options permit a called party to intelligently reject a voice over data communication session.

20 Claims, 6 Drawing Sheets

METHOD AND SYSTEM FOR PROVIDING INTELLIGENT CALL REJECTION AND CALL ROLLOVER IN A DATA NETWORK

CROSS REFERENCE TO RELATED APPLICATIONS

This application is related to U.S. Non-Provisional patent application Ser. No. 11/760,395 filed concurrently herewith, titled "Method and System for Providing Intelligent Call Rejection and Call Rollover in a Telephony Network," the contents of which are hereby incorporated by reference in their entirety.

BACKGROUND INFORMATION

Many problems exist when a customer of a telephone service provider receives a phone call and wants to reject the incoming phone call. In conventional systems, a customer is limited to sending the caller to a voice mail system or not answering the call. For example, a business customer may be in a meeting or a customer may be in a place where cell phones are not encouraged (e.g., in a movie theater, conference, class, hospital, etc.). If the customer is expecting an important call, the options available for the customer in conventional systems are to: (1) reject the call by pressing an ignore button ultimately directing the call to voicemail, and then return the call whenever possible; (2) take the call and inform the calling party that he or she will call back at a more appropriate time; or (3) not answer the call.

Other conventional passive call rejection options which are available for landline customers are: adding a list of phone numbers to a rejection call list and a switch automatically sends out a reject message when a call is received from any number on the rejection call list; pressing a reject button to reject a call; and anonymous call rejection setup (*77) which automatically rejects numbers without caller identification ("caller ID").

There are many disadvantage to the above options, several of which are discussed below. Referring to option (1), if the caller urgently needs to speak with the customer and does not know if the voice message or call has been received, the caller may try calling the customer multiple times. Referring to option (2), the customer may take the call even though it may be intrusive to others and may distract those sitting nearby.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
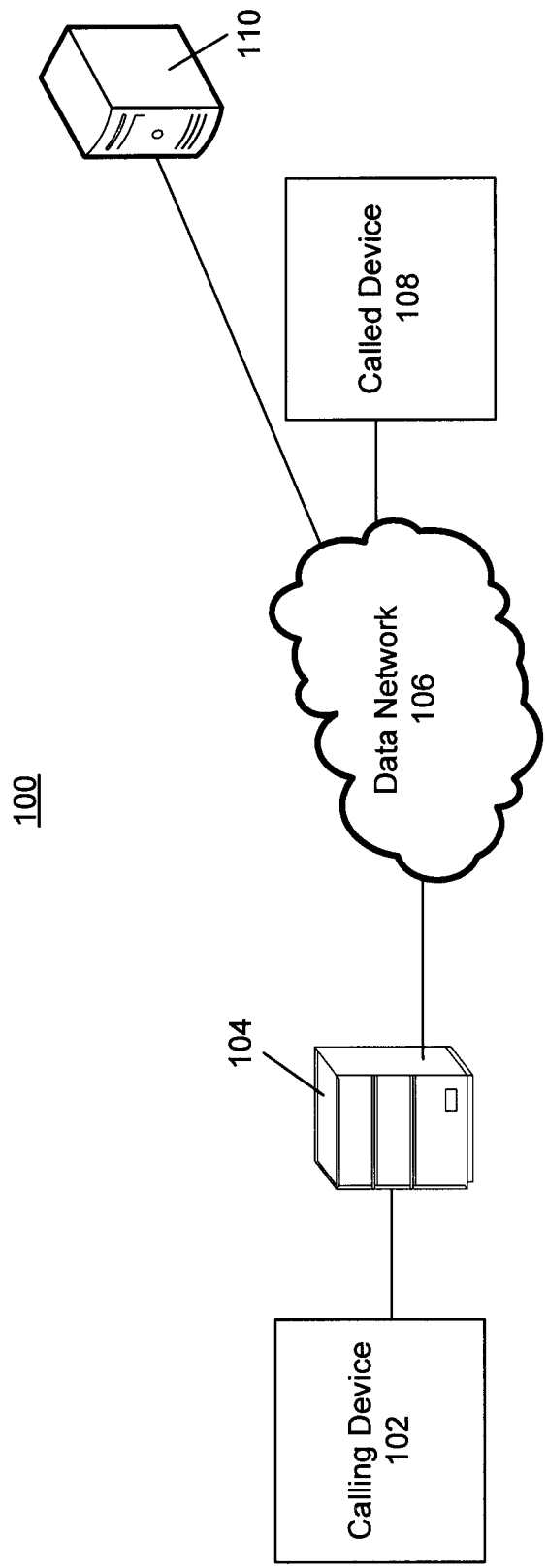
FIG. 1 is a system for providing intelligent call rejection and rollover in a data network in accordance with exemplary embodiments of the present disclosure.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method may include receiving an invite message associated with a calling device over a data network, the invite message requesting establishment of a voice over data communication session, and presenting a plurality of call rejection options, each of the plurality of call rejection options being associated with separate call rejection messages. The system and method may further include determining which one of the plurality of call rejection options is selected, where the plurality of call rejection options permit a called party to intelligently reject a voice over data communication session (e.g., a voice over Internet Protocol call).

The description below describes servers, calling devices, called devices, message platforms, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, calling devices, called devices, etc.) separately. The functions described as being performed at various components may be performed at other components, and the various components may be combined and/or separated. Other modifications also may be made.

An enhancement or product improvement in accordance with exemplary embodiments of the present disclosure may permit a called party to convey a call rejection message over a data network to an incoming caller. The called party may use the call rejection message to intelligently reject the call. Intelligent call rejection in accordance with exemplary embodiments of the present disclosure may permit the called party to select from one of many call rejection options at the time the voice over data communication session is rejected. The call rejection message may take various forms, such as, but not limited to, a message including video, audio, text, and/or combinations thereof.

Each of the call rejection options may be associated with separate call rejection messages. The call rejection messages may convey additional information to the caller based on the call rejection option selected by a called party, as opposed to conventional systems that only permit a called party to accept a call, not answer the call, or send the call to a voice messaging system. The call rejection message may indicate that the called party has received the call from the incoming caller, and optionally may include information as to when or if the called party may return the call.

FIG. 1 is a system for providing intelligent call rejection and rollover in a data network in accordance with exemplary embodiments of the present disclosure. It is noted that system 100 illustrates a simplified view of various components included in a system for implementing a voice over data communication session, and that other hardware devices and software not depicted may be included in the system 100. It is also noted that the system 100 illustrates only a single calling device 102, a single gateway 104, a single data network 106, a single called device 108, and a single message platform 110. It will be appreciated that multiple instances of these devices may be used. Moreover, the system 100 may include other devices not depicted and/or may combine the devices depicted in FIG. 1.

In an exemplary embodiment, the system 100 may include a calling device 102, a gateway 104, a data network 106, a called device 108, and a message platform 110. The calling device 102 may be a communication terminal capable of communicating packets, frame, cells, or other digital data types via the data network 106. For example, the calling device 102 and the called device 108 may be voice over Internet Protocol (VoIP) phones, session initiation protocol (SIP) clients, computers having a softphone application (i.e., software for making a telephone call over the Internet), or other devices that may communicate digitized voice, digitized audio, digitized video, text, etc., over the data network 106. The calling device 102 may be communicatively coupled to a gateway 104.

The gateway 104 may provide the calling device 102 access to the data network 106. The gateway 104 may be, for example, a soft switch, a network server (NS), a redirect server (RS), or other devices that may provide access to the data network 106. For example, the redirect server (RS) may be a Session Initiation Protocol (SIP) user agent server that generates responses to received requests, directing a client to contact an alternate set of user or server. In another example, the network server (NS) may be a Session Initiation Protocol (SIP) proxy server to route requests to a user's current location, authenticate and authorize users for services, implement provider call-routing policies, provide features to users, and/or combinations thereof.

The gateway 104 may establish a voice over data communication session between the calling device 102 and the called device 108 via the data network 106. The voice over data communication session may transport digitized voice, digitized audio, digitized video, text, etc., between the calling device 102 and the called device 108 via the data network 106. Once established, the voice over data communication session may communicate digitized data over the data network 106 between the calling device 102 and the called device 108.

The data network 106 may be, for example, an Internet protocol (IP) network, or other packet switched networks. The data network 106 also may be an Asynchronous Transfer Mode (ATM) network or other circuit switched networks. The data network 106 also may include devices to convert the digitized voice from one protocol to another. The data network 106 also may be a wired network, a wireless network, or a combination of wired and wireless networks. The data network 106 may pass digital data between various devices, such as, but not limited to, the calling device 102, the gateway 104, the called device 108, and the message platform 110.

The message platform 110 may provide a messaging system to permit a called party to intelligently reject calls received via the data network 106. The message platform 110 may be a voice platform, a server, or other computing device that may communicate call rejection messages to the calling device 102. In an exemplary embodiment, the voice platform may be a software application, hardware, or a combination of both software and hardware which may store voice messages for a data network. The voice platform may, for example, be used for traditional phone networks or mobile and soft switch networks. The voice platform may be a complete product permitting the user to store messages, select options to customize individual messages, handle voice message related queries, combinations thereof, and/or provide other features related to handling and managing of messages.

In an exemplary embodiment, the call rejection messages may be audio messages, text messages, video messages, and/or combinations thereof. The call rejection message may be, for example, a voice message such as, "Hi, you have reached Bob. I'm not here to answer your call right now, but please leave a message and I'll get back to you as soon as possible." In another example where the called party is expecting an important call during a meeting, the called party may prerecord a message such as, "Hi Larry, I was pulled into a meeting last minute that lasts until about 4:30 today. I'll call you as soon as I'm done." The message platform 110 may process messages received from the called device 108, and also may include a database local or remote to the message platform 110 to store prerecorded messages to generate the call rejection message. The message platform 110 may communicate the call rejection message to the calling device 102, as will be discussed in further detail below.

Figure 2:
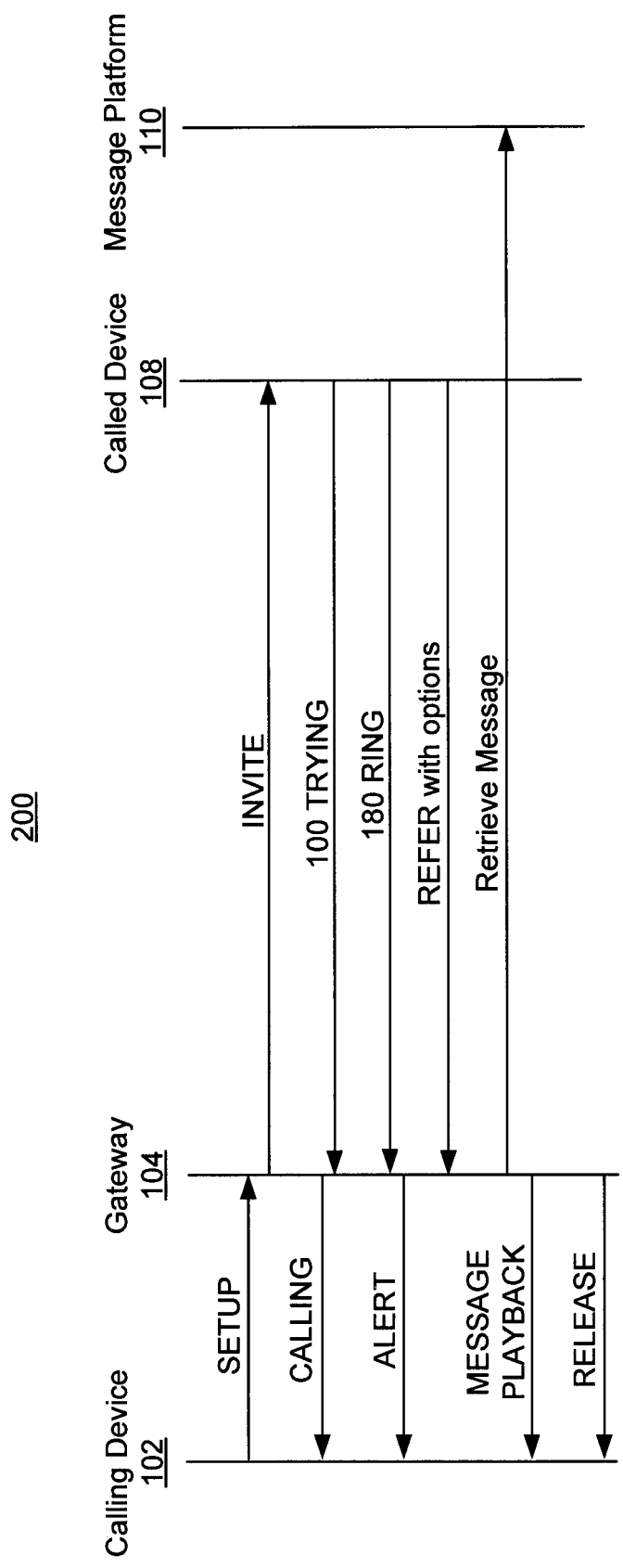
FIG. 2 is a signaling diagram that illustrates messages communicated between a calling device and a called device in a system to set up and intelligently reject a voice over data communication session in accordance with exemplary embodiments of the present disclosure.

FIG. 2 is a signaling diagram that illustrates messages communicated between a calling device and a called device in the system 100 to set up and intelligently reject a voice over data communication session in accordance with exemplary embodiments of the present disclosure. The signaling diagram 200 may include messages sent between the calling device 102, the gateway 104, the called device 108, and the message platform 110. The example depicted in FIG. 2 is based on setting up a Voice over Internet Protocol (VoIP) call using a session initiation protocol (SIP). It is noted, however, that data networks other than IP networks and protocols other than SIP may be used to set up the voice over data communication session between the calling device 102 and the called device 108.

Initially, when a caller of the calling device 102 wants to establish a voice over data communication session with the called device 108, the caller may input a network address (e.g., a telephone number, an Internet Protocol address, etc.) of the called device 108 into the calling device 102. The calling device 102 may then communicate a setup message (e.g., a SIP setup message) to the gateway 104. The setup message may include a network address of the calling device 102 and a network address of the called device 108.

Upon receipt of the setup message, the gateway 104 may generate and communicate an invite message (e.g., a SIP INVITE message) to the called device 108 via the data network 106. The invite message may invite the called device 108 to establish a voice over data communication session with the calling device 102 over the data network 106.

After sending the invite message, the gateway 104 may communicate a calling message (e.g., a SIP Calling message) to inform the calling device 102 that the gateway 104 has sent the invite message to the called device 108.

After receiving the invite message, the called device 108 may communicate a trying message (e.g., a SIP 100 trying message) to the gateway 104. The trying message may indicate that the called device 108 is generating an alerting signal to inform the called party associated with the called device 108 about the available voice over data communication session.

After communicating the trying message, the called device 108 may communicate a ring message (e.g., a SIP Ring message) to the gateway 104. The ring message may indicate that the voice over data communication session has been successfully established between the calling device 102 and the called device 108, and that the called device 108 may be waiting for the called party to answer. While the called device 108 is generating the alerting signal, the called device 108 may present the called party with various call rejection options to intelligently reject the voice over data communication session. Intelligently rejecting the voice over data communication session may permit the called party to inform the caller about why the called party is rejecting the voice over data communication session at the time the invite message is received. The called device 108 may include various modules to receive the signaling messages from the data network 106, and to present the call rejection options to the called party.

Figure 3:
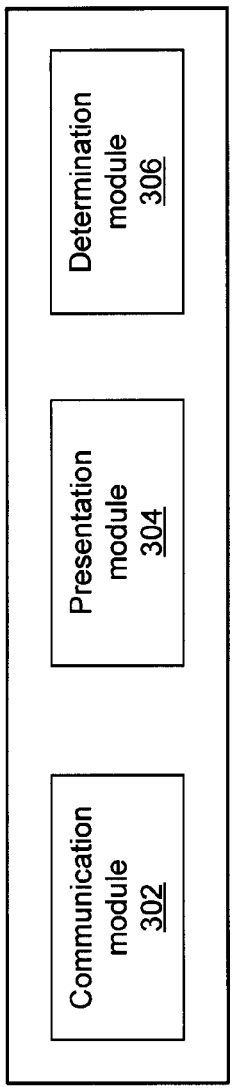
FIG. 3 illustrates various modules of a called device in accordance with exemplary embodiments of the present disclosure.

FIG. 3 illustrates various modules of a called device in accordance with exemplary embodiments of the present disclosure. The various modules of the called device 108 may permit the called party to intelligently reject the voice over data communication session. The called device 108 may include a communication module 302, a presentation module 304, and a determination module 306. It is noted that the modules 302, 304 and 306 are exemplary and the functions performed by one or more of the modules may be combined with that performed by other modules. The functions described herein as being performed by the modules 302, 304 and 306 also may be separated and may be performed by other modules local or remote to the called device 108.

The communication module 302 of the called device 108 may communicate messages to and from the data network 106. The communication module 302 also may communicate messages to and from the presentation module 304 and the determination module 306. When an invite message is received from the data network 106, the communication module 302 may process the invite message and may forward the invite message to the presentation module 304.

The presentation module 304 may process the invite message and may present call rejection options at the called device 108 to the called party. The presentation module 304 may present the call rejection options audibly, visually, textually, and/or combinations thereof. For example, presentation module 304 may provide the called party with a visual, an audible, or a textual display letting the called party know about the available voice over data communication session and the call rejection options. The display may prompt the called party to select one of several call rejection options.

Also, the presentation module 304 may present a call rejection display after the called party has input information at the called device 108 indicating that the called party is not going to accept the voice over data communication session. For example, the presentation module 304 of the called device 108 may first present the called party with an option to take the voice over data communication session and an option to reject the voice over data communication session. After selecting the rejection option, the presentation module 304 may present a call rejection display. Additionally, the presentation module 304 may include in the call rejection display an accept call option to permit the called party to accept the voice over data communication session. The called party may use the call rejection options to intelligently reject the voice over data communication session. The call rejection options may permit the called party to inform the caller as to why the called party is unable to take the voice over data communication session at the time the invite message is received.

Figure 4:
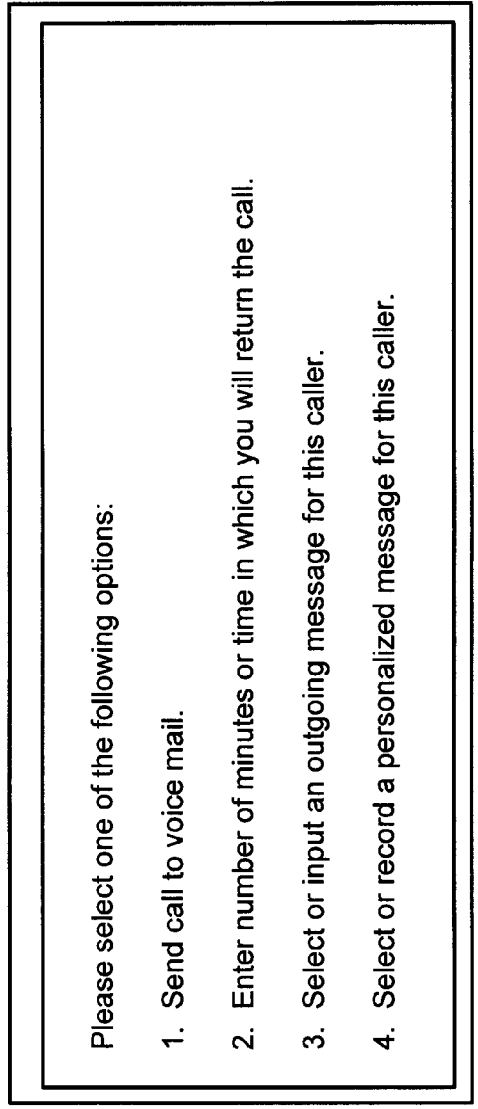
FIG. 4 illustrates a visual display presented at a called device by a presentation module in accordance with exemplary embodiments of the present disclosure.

FIG. 4 illustrates a visual call rejection display presented at a called device by a presentation module in accordance with exemplary embodiments of the present disclosure. In an exemplary embodiment, the visual call rejection display 400 may include four call rejection options: (1) a first call rejection option to send the voice over data communication session to voicemail; (2) a second call rejection option to enter a number of minutes or a time in which the called party may call the caller back; (3) a third call rejection option to select and/or input an output message (e.g., audio, text, video, etc.) for the caller; and (4) a fourth call rejection option to select and/or record a personalized message for this caller. It is noted that the call rejection options described in FIG. 4 are exemplary. Other call rejection options may be presented, and the presentation module 304 may present more or fewer call rejection options based on the system used or the preferences of the called party. It is noted that in addition to or instead of a visual call rejection display, the presentation module 304 also may present the call rejection options as video, text, audio, and/or combinations thereof.

To select the desired call rejection option, the called party may use a key on a keypad (e.g., depress a key, scroll a wheel, etc.), may use a button on a side of the called device 108, may speak a selection, may use a motion (e.g., the called device 108 may include a gyroscope or other motion detector to detect when the called party moves the called device 108 a certain angle, or shakes, swings, maneuvers, and/or otherwise moves the called device 108, etc.), or may use other manners of selecting between the different call rejection options. For example, the called party may press a key on a keypad to select the second option (e.g., may press a "2" key to select the second option), and may then select number keys on a keypad to enter a number of minutes (e.g., may select a "1" key followed by a "0" key to select ten minutes).

The called party may select the call rejection options to instruct the message platform 110 on how to intelligently reject the voice over data communication session. Selecting the first call rejection option may cause the called device 108 to generate a refer message to roll the voice over data communication session over to the message platform 110 to send the caller to voicemail. The refer message may transfer the voice over data communication session to the message platform 110, and may instruct the message platform 110 on how to handle the voice over data communication session.

If the second call rejection option is selected, the presentation module 304 may present the called party with an interface (e.g., graphical, audible, etc.) at the called device 108 that prompts the called party to input a length of time (e.g., minutes, hours, days, etc.) or a return call time (e.g., 4:30

P.M.) in which the called party may return the voice over data communication session. For example, the called party may select a number key "1" followed by a number key "0" on a keypad of the called device 108, optionally followed by a "#" key to input ten minutes as a length of time. The presentation module 304 also may present predefined time intervals (e.g., 10 minutes, 20 minutes, tomorrow, etc.) in the interface for selection by the called party. The presentation module 404 may include the entered length of time, the return call time, or the predefined time interval in a time parameter. The called device 108 may generate and forward a refer message that includes the second call rejection option and the time parameter to roll the voice over data communication session over to the message platform 110.

Upon selecting the third call rejection option, the presentation module 304 may present the called party with an interface (e.g., graphical, audible, etc.) at the called device 108 that provides the called party with a choice between one or more outgoing messages. The outgoing messages may be stored at the called device 108 or may be stored at the message platform 110. The outgoing message may be, for example, an ASAP message indicating that called party may return the call as soon as possible. The outgoing message may be created by the called party prior to or after receiving the invite message. The presentation module 304 of the called device 108 also may present predefined outgoing messages that the called party may select. Once the called party selects one of the outgoing messages, the called device 108 may generate and forward a refer message that includes the third call rejection option and an outgoing message parameter to roll the voice over data communication session over to the message platform 110. The outgoing message parameter may indicate whether the refer message includes the outgoing message. Also, the message platform 110 may store multiple outgoing messages in one or more databases associated with a network address of the called device 108, and the message platform 110 may identify a stored outgoing message based on the outgoing message parameter of the refer message. For example, the message platform 110 may identify, retrieve, and forward an ASAP outgoing message associated with the outgoing message parameter to the calling device 102.

If the fourth call rejection option is selected, the presentation module 304 may present the called party with an interface (e.g., graphical, audible, etc.) at the called device 108 that prompts the called party to record a personalized message (e.g., an audio message, a video message, etc.) or that prompts the called party to identify a pre-recorded personalized message stored at the message platform 110. For example, the called party may use a video recorder at the called device 108 to record a video of the called party at the time the invite message is received stating: "Hi John, I'm at the hospital right now. I'll call you back in a little bit." The personalized message may be a wav file, an mp3 file, or other file types for storing audio, video, text, as are well known. The called device 108 may forward a refer message that includes the fourth call rejection option and a personalized message parameter to roll the voice over data communication session over to the voicemail platform 110. The personalized message parameter may indicate that the refer message includes a newly recorded personalized message. Also, the called party may pre-record and may store one or more personalized messages at the message platform 110, and the message platform 110 may use the personalized message parameter to identify, retrieve, and forward the personalized message associated with the parameter to the calling device 102.

Referring again to FIG. 3, the determination module 306 may monitor a predetermined time interval after the invite message has been received to determine if the called party has selected any of the call rejection options during the predetermined time interval. The predetermined time interval may be a length of time (e.g., a number of seconds, minutes, etc.), a number of rings, or other time intervals that may be selected by the system 100 or by the called party. If the called party does not respond within the predetermined time interval, the determination module 306 may select a default call rejection option for the called party that rolls the voice over data communication session to the message platform 110. For example, the default call rejection option may be the first call rejection option in FIG. 4 that identifies a default message stored at the message platform 110 that generically greets all callers (e.g., "Hi, this is Bob. Please leave me a message."). The default message may include audio, video, text, and/or combinations thereof. If the called party selects a call rejection option before the predetermined time interval expires, the determination module 306 may identify the call rejection option selected by the called party and may receive any inputs to create the parameters (e.g., outgoing message parameter, personalized message parameter, etc.) for inclusion in the refer message.

After the determination module 306 identifies the call rejection option selected by the called party or the default call rejection option, and receives any inputs to create the parameters, the determination module 306 may generate a refer message (e.g., a SIP REFER message) and may communicate the refer message to the gateway 104. The refer message may transfer the voice over data communication session to the message platform 110 via the gateway 104 and may terminate the voice over data communication session between the gateway 104 and the called device 108. The refer message may include the selected call rejection option or the default call rejection option. The refer message also may include a network address of the calling device 102, a network address of the called device 108, information for routing the voice over data communication session over the data network 106 to the message platform 110, a time parameter, an outgoing message parameter, a personalized message parameter, combinations thereof, and/or other information associated with the call or the called party. After receiving the refer message, the gateway 104 may communicate the refer message to the message platform 110.

The message platform 110 may process the refer message and may communicate call rejection messages to the calling device 102 based on information included in the refer message. The call rejection messages may include an outgoing message, a length of time message, a return call time message, a personalized message, and/or combinations thereof, received in or identified by parameters included in the refer message. For example, the call rejection messages may be audio messages, text messages, video messages, and/or combinations thereof. The call rejection message may be, for example, a voice message such as, "Hi, you have reached Bob. I'm not here to answer your call right now, but please leave a message and I'll get back to you as soon as possible." In another example where the called party is expecting an important call during a meeting, the called party may pre-record a message such as, "Hi Larry, I was pulled into a meeting at the last minute that ends around 4:30 today. I'll call you as soon as I'm done."

The message platform 110 also may permit the called party to select certain times during a day as to when different call rejection messages are active. The called party may specify time periods during which a particular call rejection message is active and may specify an expiration time/date for particular call rejection messages. For example, a called party may be expecting an important call from Bob. The called party may be in a meeting that will last until 11:00 A.M. on May 12. The called party may pre-record a video message for Bob and may indicate that the message is active until 11:00 A.M. on May 12. When a refer message is received, the message platform 110 may examine whether the call rejection message (e.g., pre-recorded video) is active at the time the refer message is received, and may communicate the call rejection message to the calling device 102 if the pre-recorded message is active. Otherwise, the message platform 110 may use a default message. The called party may use a graphical or audible interface at the called device 108 (or at a different computing device or telephony device) to input (e.g., textually, audibly, etc.) or select during which time periods a particular call rejection message is active. In other exemplary embodiments the called party may use an Internet-based interface to select and record call rejection messages. Other interfaces also may be used.

In an exemplary embodiment, the message platform 110 may include one or more local or remote databases that store one or more call rejection messages. The message platform 110 may index the database(s) based on a network address of the called device 108 to retrieve data and/or messages associated with the called party. The message platform 110 also may use parameters included in the refer message to index the database to identify and retrieve call rejection messages stored in the database. Additionally, the call rejection messages may be associated with a network address of the calling device 102, a call rejection option, combinations thereof, and/or other information associated with the call, the calling device 102, and the called device 108 for indexing the database.

When the message platform 110 receives a refer message that includes the first call rejection option, the message platform 110 may access a call rejection message that the called party may use to generically greet all callers. The message platform 110 may index the database based on a network address of the called device 108 and on the first call rejection option to identify the call rejection message associated with the network address and the first call rejection option. For example, the call rejection message may be a textual message, a video message, an audio message, and/or combinations thereof that states "Hello, you have reached Bob's Voice over IP phone. Please leave me a message and I'll call you back."

When the message platform 110 receives a refer message that includes the second call rejection option and a time parameter, the message platform 110 may access a call rejection message that the called party may use to greet all callers and also that identifies a length of time or a time in which the called party intends to return the call. The message platform 110 may index the database based on a network address of the called device 108 and on the time parameter to identify a call rejection message. For example, the call rejection message may be a textual message, a video message, an audio message, and/or combinations thereof that includes "I received your message. I will call back in 10 minutes." In another example, the message platform 110 may index the database to retrieve a personal greeting for the caller based on a network address of the calling device 102, a network address of the called device 108, and the time parameter. The call rejection message may include "Hi Bob, I'm in a meeting right now. I will call you back at 4:30." The audio and/or video message may be prerecorded by the called party, or may be computer generated.

When the message platform 110 receives a refer message that includes the third call rejection option and an outgoing message parameter, the message platform 110 may determine whether an outgoing message is included in the outgoing message parameter or whether the outgoing message parameter may be used to index the database of the message platform 110. If the outgoing message is included in the outgoing message parameter, the message platform 110 may communicate a call rejection message including the outgoing message to the calling device 102. If the outgoing message is not included, the message platform 110 may index the database based on a network address of the called device 108 and on the outgoing message parameter to retrieve the outgoing message. The message platform 110 may then communicate a call rejection message including the outgoing message to the calling device 102. For example, the call rejection message may include a text message that states "I received your message. I will call you back as soon as possible."

When the message platform 110 receives a refer message that includes the fourth call rejection option and a personalized message parameter, the message platform 110 may determine whether a personalized message is included in the personalized message parameter or whether the personalized message parameter may be used to index the database of the message platform 110. If the personalized message is included, the message platform 110 may communicate a call rejection message including the personalized message to the calling device 102. If the personalized message is not included, the message platform 110 may index the database based on a network address of the called device 108, based on the personalized message parameter, and based on a network address of the calling device 102 to retrieve the personalized message. The message platform 110 may then communicate a call rejection message including the personalized message to the calling device 102. For example, the call rejection message may be a video message, an audio message, and/or combinations thereof that includes "Hi Bob. I received your message. I will call back at 4:30 after my meeting is over."

After the message platform 110 identifies and/or generates the call rejection message, the message platform 110 may communicate the call rejection message to the gateway 104 via the data network 106. The gateway 104 may receive the call rejection message from the message platform 110 via the data network 106 and may communicate the call rejection message to the calling device 102. The calling device 102 may present the call rejection message to the caller. For example, the calling device 102 may present the call rejection message as audio, video, text, and/or combinations thereof. The call rejection message may inform the caller that the called party received the voice over data communication session, and may inform the caller with information as to why the called party rejected the voice over data communication session.

After the caller has received the call rejection message, the message platform 110 may present the caller with an option to leave a message with the message platform 110 or terminate the voice over data communication session. For example, the caller may receive the call rejection message indicating that the called party will call the caller back in ten minutes. If this is acceptable to the caller, the caller may end the voice over data communication session and may wait for ten minutes. If waiting ten minutes causes a problem or the caller would like to leave a message for the called party, the caller may communicate a message (e.g., voice message, video message, text message, etc.) to the message platform 110. For example, the caller may communicate a voice message stating that the caller is unavailable in ten minutes, but will call back in thirty minutes. When the caller decides to terminate the voice over data communication session, the calling device 102 may communicate a release message (e.g., a SIP release message)

to the gateway 104 to terminate the voice over data communication session with the called device 108.

Figure 5:
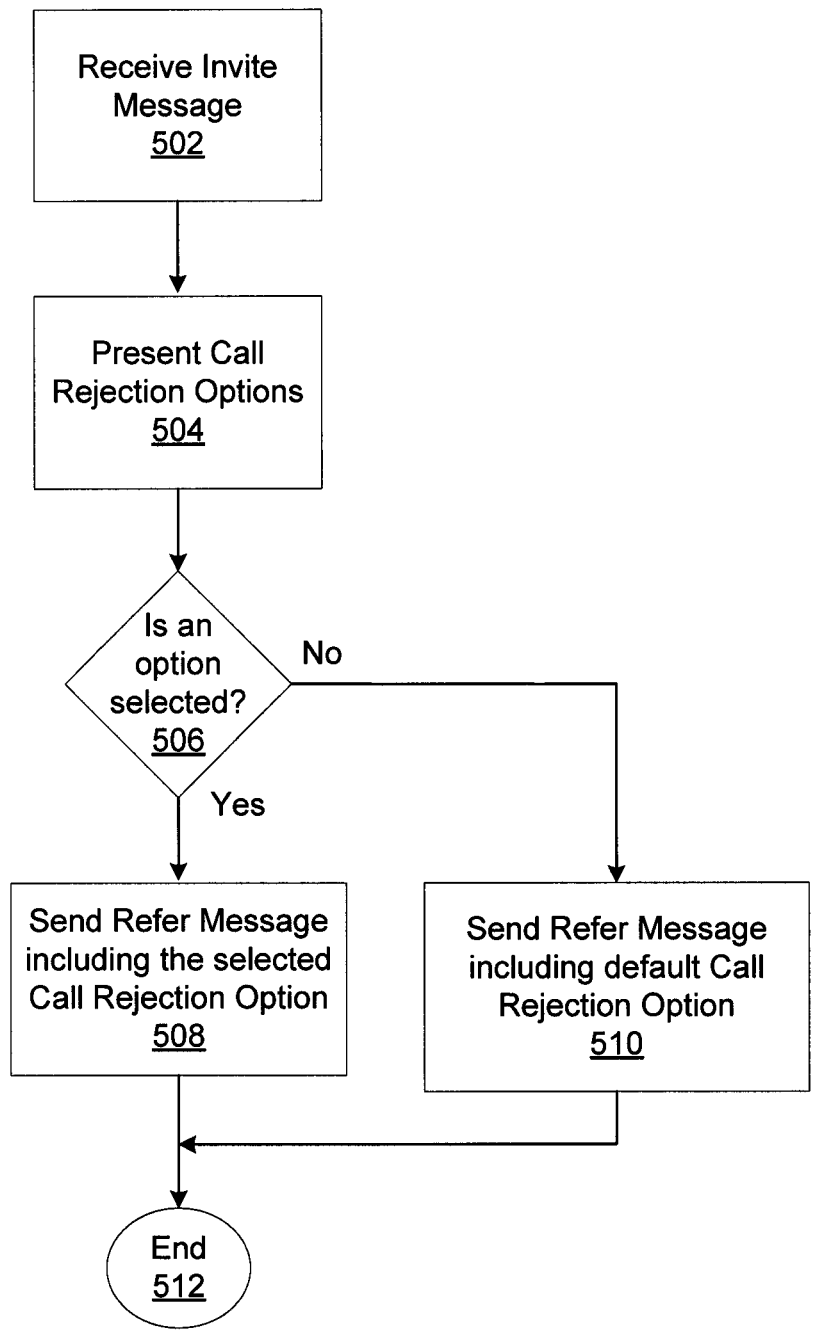
FIG. 5 illustrates a flow diagram of a method for processing signaling messages at a called device to set up and intelligently reject a voice over data communication session in accordance with exemplary embodiments of the present disclosure.

FIG. 5 illustrates a flow diagram of a method for processing signaling messages at a called device to set up and intelligently reject a voice over data communication session in accordance with exemplary embodiments of the present disclosure. The exemplary method 500 is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the called device 108 may receive an invite message via the data network 106 from the gateway 104. The invite message may be used to set up a voice over data communication session over the data network 106 between the calling device 102 and the called device 108. The method 500 may then proceed to block 504.

In block 504, the presentation module 304 of the called device 108 may present the called party with multiple call rejection options. For example, the presentation module 304 may present the called party with audible, visual, or textual information about the call rejection options to allow the called party to intelligently reject the call. The method 500 may then proceed to block 506.

In block 506, the determination module 306 of the called device 108 may determine whether any of the call rejection options have been selected within a predetermined time interval. If a call rejection option has been selected within the predetermined time interval, the method 500 may proceed to block 508. If the call rejection option has not been selected within the predetermined time interval, the method 500 may proceed to block 510.

In block 508, the determination module 306 may generate a refer message including the selected call rejection option and the communication module 302 may communicate the refer message to the gateway 104 via the data network 106. The gateway 104 may roll the voice over data communication session to the message platform 110 and may terminate the voice over data communication session with called device 108. The method 500 then continues to block 512 and ends.

In block 510, the determination module 306 may generate and may communicate a refer message including a default call rejection option to the gateway 104 via the data network 106. The gateway 104 may roll the voice over data communication session to the message platform 110 and may terminate the voice over data communication session with called device 108. The method 500 then continues to block 512 and ends.

Figure 6:
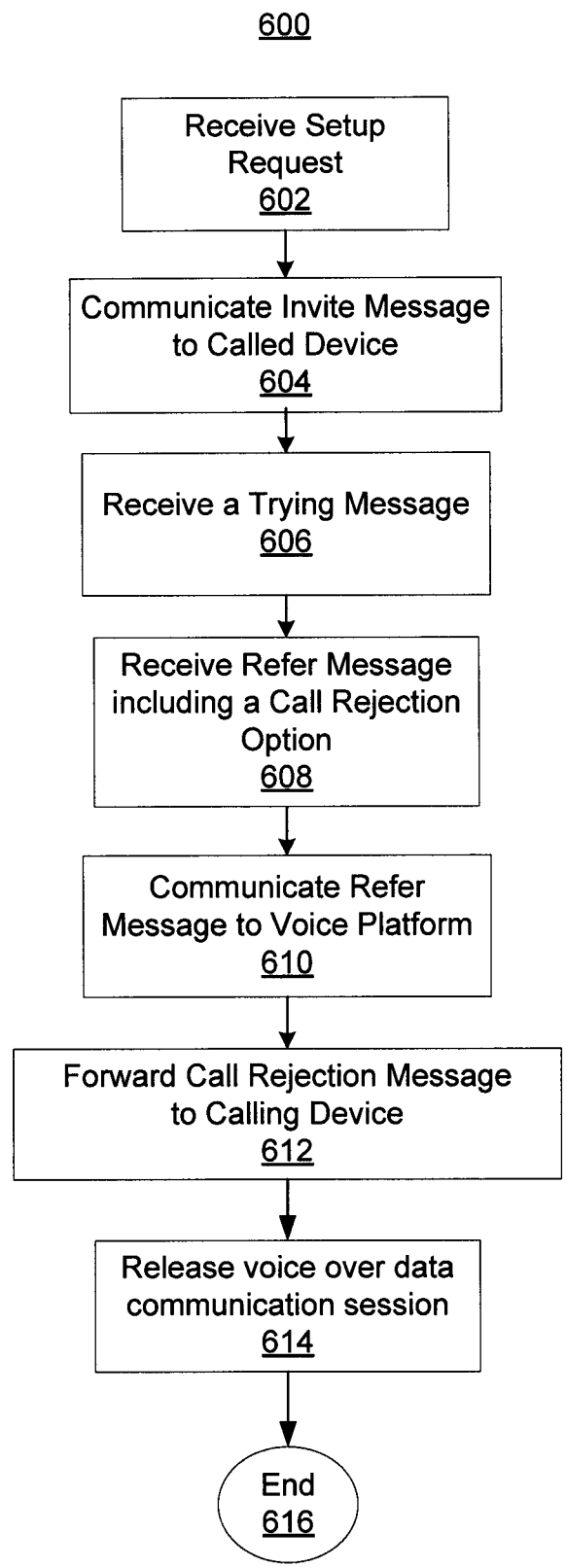
FIG. 6 illustrates a flow diagram of a method for processing signaling messages at a gateway to set up and intelligently reject a voice over data communication session in accordance with exemplary embodiments of the present disclosure.

FIG. 6 illustrates a flow diagram of a method for processing signaling messages at a gateway to set up and intelligently reject a voice over data communication session in accordance with exemplary embodiments of the present disclosure. The exemplary method 600 is provided by way of example, as there are a variety of ways to carry out methods disclosed herein. The method 600 shown in FIG. 6 can be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the gateway 104 may receive a setup request from a calling device 102 that requests establishment of a voice over data communication session with the called device 108. The method 600 may continue to block 604.

In block 604, the gateway 104 may communicate an invite message to the called device 108 via the data network 106 that invites the called device 108 to establish a voice over data communication session with the calling device 102. The method 600 may continue to block 606.

In block 606, the gateway 104 may receive a trying message from the called device 108 via the data network 106. The trying message may indicate that the voice over data communication session has been established with the called device 108 and that the called device 108 is waiting for a response from the called party. The method 600 may continue to block 608.

In block 608, the gateway 104 may receive a refer message including a call rejection option from the called device 108 via the data network 106. The method 600 may continue to block 610.

In block 610, the gateway 104 may communicate the refer message to the message platform 110 via the data network 106 to retrieve a call rejection message associated with the call rejection option. The gateway 104 may roll the voice over data communication session to the message platform 110 and may terminate the voice over data communication session with called device 108. The message platform 110 may use the call rejection option associated with the refer message to identify and/or generate a call rejection message. The method 600 may continue to block 612.

In block 612, the gateway 104 may receive a call rejection message from the message platform 110 and may communicate the call rejection message to the calling device 102. The method 600 may continue to block 614.

In block 614, the gateway 104 may receive a release message from the calling device 102. The release message may instruct the gateway 104 to terminate the voice over data communication session between the calling device 102 and the message platform 110. The method 600 continues to block 616 and ends.

Figure 7:
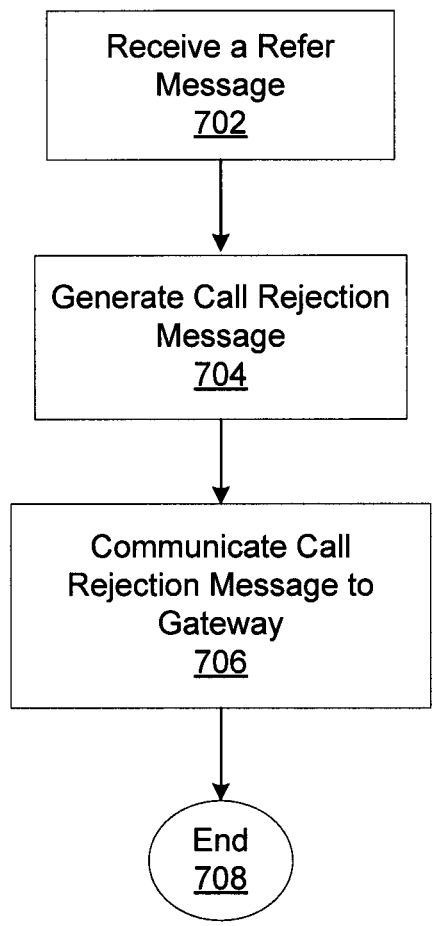
FIG. 7 illustrates a flow diagram of a method for processing signaling messages at a message platform to set up and intelligently reject a voice over data communication session in accordance with exemplary embodiments of the present disclosure.

FIG. 7 illustrates a flow diagram of a method for processing signaling messages at a message platform to set up and intelligently reject a voice over data communication session in accordance with exemplary embodiments of the present disclosure. The exemplary method 700 is provided by way of example, as there are a variety of ways to carry out methods disclosed herein. The method 700 shown in FIG. 7 can be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the message platform 110 may receive a refer message from the gateway 104 via the data network 106 to roll the voice over data communication session from the called device 108 to the message platform 110. The refer message may include a call rejection option. The message platform 110 may communicate via the voice over data communication session with calling device 102. The method 700 may continue to block 704.

In block 704, the message platform 110 may process the refer message to identify and/or generate a call rejection message. The call rejection message may be based on information included in the refer message or may be based on information retrieved from a database of the message platform 110. For example, the message platform 110 may process the refer message to identify any parameters included therein. The message platform 110 may analyze the parameters to determine whether the parameters include information for generating the call rejection message, or whether the parameters may be used to index the database. For example, the refer message may include an outgoing message parameter. The outgoing message parameter may include an outgoing message that the message platform 110 may extract from the refer message and may include in the call rejection message. In another example, the outgoing message parameter may include data for indexing a database to retrieve an outgoing message stored at the database of the message platform 110. The message platform 110 may identify and retrieve the outgoing message from the database and may include the retrieved outgoing message in the call rejection message. The method 700 may then continue to block 706.

In block 706, the message platform 110 may communicate the call rejection message to the gateway 104 associated with the calling device 102 via the data network 106. The gateway 104 may forward the call rejection message to the calling device 102, which may cause the calling device 102 to display the audio, video, text, and/or combinations thereof of the call rejection message to inform the caller that the called party has received the voice over data communication session and optionally as to why the called party has rejected the voice over data communication session. The method 700 then continues to 708 and ends.

The following describes an example of intelligent call rejection in accordance with exemplary embodiments of the present disclosure. In this example, a called party associated with the called device 108 is in a movie theater where cell phone usage is not encouraged. The called party of the called device 108, however, is waiting for an important call. In this example, the calling device 102 may communicate a setup request to the gateway 104 requesting establishment of a voice over communication session with the called device 108. The gateway may receive the setup request and may communicate an invite message to the called device 108 via the data network 106 to request establishment of a voice over data communication session. The called device 108 may receive the invite message and may establish a voice over data communication session with the calling device 102. The called device 108 may generate an alerting signal to inform the called party about the voice over data communication session. The called device 108 also may present the called party with a visual display of various call rejection options to permit the called party to intelligently reject the voice over data communication session. For example, the called device 108 may present the called party with a first call rejection option to send the voice over data communication session to the message platform 110 to play a voice mail message, a second call rejection option to input a length of time, a third call rejection option to send an outgoing message to the caller, and a fourth call rejection option to record and/or select a personalized message.

After the called device 108 receives the invite message, the determination module 306 of the called device 108 may determine whether the called party selects one of the call rejection options within a predetermined time interval. In this example, the called party selects the second call rejection option before the predetermined time interval expires and then selects a "1" key, followed by a "0" key, followed by a "#" key on a keypad of the called device 106 to inputs ten minutes as a length of time. The determination module 306 then generates a refer message that includes ten minutes as a length of time parameter. The communication module 302 of the called device 108 may communicate the refer message to the gateway 104 associated with the calling device 102. The gateway 104 may terminate the voice over data communication session between the gateway 104 and the called device 108, may roll the voice over data communication session to the message platform 110, and may forward the refer message to the message platform 110.

The message platform 110 may receive and may analyze the refer message to identify the length of time parameter. The message platform 110 may then generate a call rejection message that includes the selected length of time (i.e., ten minutes). The call rejection message may include audio, text, video, and/or combinations thereof to inform the caller that the called party will return the call in ten minutes. The message platform 110 may communicate the call rejection message to the gateway 104 associated with the calling device 102 via the data network 106. The gateway 104 may then forward the call rejection message to the calling device 102. The calling device 102 may receive and may present the call rejection message to the caller. In this example, the call rejection message may be audio that states "I will return your call in 10 minutes." The message platform 110 may present the caller with the option to terminate the voice over data communication session or to leave a message for the called party, and the caller in this example may use the calling device 102 to terminate the voice over data communication session.

Thus, as described in the exemplary embodiments provided herein, the system 100 may provide an intelligent rejection process to permit called parties to intelligently reject calls in a voice over data network environment. Intelligent rejection may permit the called party to select between various call rejection options at the time when a voice over data communication session is received to inform callers as to why the called party has rejected the voice over data communication session.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for communicating a call rejection over a data network, comprising:

receiving, at a called device, an invite message associated with a calling device over the data network, the invite message requesting establishment of a voice over data communication session;

communicating a ring message from the called device to a gateway via the data network indicating that the voice over data communication session is successfully established between the calling device and the called device;

presenting, by the called device to a called party one or more of a plurality of call rejection options based on preferences of the called party, wherein the one or more of the plurality of call rejection options are associated with separate call rejection messages activated based at least in part on a time of a day, wherein each of the separate call rejection messages is associated with an expiration date and an expiration time;

monitoring, by the called device, a predetermined time interval after the invite message is received to determine whether the called party selected any one of the one or more of the plurality of call rejection options during the predetermined time interval, wherein one of the one or more of the plurality of call rejection options is selected based on receiving a called party input at the called device, the called party input being one of a voice input, a selection of a key on a keypad, and a motion input;

determining which one of the one or more of the plurality of call rejection options is selected by the called party during the predetermined time interval and, if a selection is determined not to have been made by the called party within the predetermined time interval, automatically selecting, by the called device, a default call rejection option of the call rejection options;

communicating a refer message from the called device, including a first call rejection option of the plurality of call rejection options to a gateway via the data network, wherein the refer message further comprises a network address of the calling device, a network address of the called device, information for routing the voice over data communication session over the data network to a message platform, an outgoing message parameter, a time parameter, and a personalized message parameter;

communicating, by the gateway, the refer message to the message platform based on the information for routing the voice over data communication session over the data network to the message platform; and identifying, by the message platform, the refer message and communicating a call rejection message to the calling device based on the first call rejection option included in the refer message.

2. The method of claim 1, wherein the time parameter identifies at least one of a length of time and a return call time.

3. The method of claim 1, wherein the outgoing message parameter instructs the message platform to retrieve an outgoing message.

4. The method of claim 1, wherein the personalized message parameter instructs the message platform to retrieve a personalized message.

5. The method of claim 4, wherein the personalized message is at least one of audio, text, or video.

6. The method of claim 4, wherein the personalized message is one of a pre-recorded message or a newly recorded message.

7. The method of claim 1, wherein the plurality of call rejection options are presented as at least one of audio, text, or video.

8. The method of claim 1, wherein the default call rejection option instructs the message platform to communicate a default message to the calling device.

9. The method of claim 8, wherein the default message is at least one of audio, text, or video.

10. A non-transitory computer readable media comprising code executed by a computer processor to perform the acts of the method of claim 1.

11. The method of claim 1, wherein the predetermined time interval is at least one of a length of time and a number of rings.

12. A system for communicating a call rejection over a data network, comprising:

a called device communicatively coupled to a data network, the called device receiving an invite message associated with a calling device via the data network, the invite message requesting establishment of a voice over data communication session, communicating a ring message from the called device to a gateway via the data network indicating that the voice over data communication session is successfully established between the calling device and the called device, presenting, by the called device, one or more of a plurality of call rejection options based on the preferences of the called party, wherein the one or more of the plurality of call rejection options are associated with separate call rejection messages activated based at least in part on a time of a day, wherein each of the separate call rejection messages is associated with an expiration date and an expiration time, monitoring, by the called device, a predetermined time interval after the invite message is received to determine whether the called party selected any one of the one or more of the plurality of call rejection options during the predetermined time interval, wherein one of the one or more of the plurality of call rejection options is selected based on receiving a called party input at the called device, the called party input being one of a voice input, a selection of a key on a keypad, and a motion input, determining which one of the plurality of call rejection options is selected by the called party during the predetermined time interval, and, if a selection is determined not to have been made by the called party within the predetermined time interval, automatically selecting, by the called device, a default call rejection option of the call rejection options, and generating, by the called device, a refer message comprising a call rejection option of the plurality of call rejection options, wherein the refer message further comprises a network address of the calling device, a network address of the called device, information for routing the voice over data communication session over the data network to a message platform, an outgoing message parameter, a time parameter, and a personalized message parameter; and a message platform communicatively coupled to the data network, the message platform to receive the refer message from the called device via the gateway based on the information for routing the voice over data communication session over the data network to the message platform, identifying, by the message platform, the refer message, and to communicate a call rejection message associated with the call rejection option to the calling device based on the call rejection option included in the refer message.

13. An apparatus for communicating a call rejection over a data network comprising a memory for storing one or more modules, said one or more modules comprising:

a communication module communicatively coupled to a data network, the communication module to receive an invite message associated with a calling device via the data network, the invite message requesting establishment of a voice over data communication session, and to communicate a ring message from a called device to a gateway via the data network indicating that the voice over data communication session is successfully established between the calling device and the called device;

a presentation module communicatively coupled to the communication module, the presentation module to process the invite message and to present one or more of a plurality of call rejection options based on preferences of a called party, wherein the one or more of the plurality of call rejection options are associated with separate call rejection messages activated based at least in part on a time of a day, wherein each of the separate call rejection messages is associated with an expiration date and an expiration time; and a determination module communicatively coupled to the presentation module, the determination module to:

monitor a predetermined time interval after the invite message is received to determine whether a called party selected any one of the one or more of the plurality of call rejection options during the predetermined time interval, wherein one of the one or more of the plurality of call rejection options is selected based on receiving a called party input at the called device, the called party input being one of a voice input, a selection of a key on a keypad, and a motion input, determine which one of the one or more of the plurality of call rejection option is selected during the predetermined time interval, and, if a selection is determined not to have been made by the called party within the predetermined time interval, automatically selecting, by the called device, a default call rejection option of the call rejection options, and to generate a refer message comprising a call rejection option of the plurality of call rejection options, wherein the refer message further comprises a network address of the calling device, a network address of the called device, information for routing the voice over data communication session over the data network to a message platform, an outgoing message parameter, a time parameter, and a personalized message parameter wherein the communication module is further configured to communicate, via the gateway, the refer message to a message platform based on the information for routing the voice over data communication session over the data network to the message platform, wherein the message platform identifies the refer message, and communicates a call rejection message associated with the call rejection option to the calling device based on the call rejection option included in the refer message.

14. The apparatus of claim 13, wherein the time parameter identifies at least one of a length of time and a return call time.

15. The apparatus of claim 13, wherein the personalized message parameter instructs the message platform to retrieve a personalized message.

16. The apparatus of claim 15, wherein the personalized message is at least one of audio, text, or video.

17. The apparatus of claim 13, wherein the plurality of call rejection options are presented as at least one of audio, text, or video.

18. The apparatus of claim 13, wherein the default call rejection option instructs the message platform to communicate a default message to the calling device.

19. The apparatus of claim 18, wherein the default message is at least one of audio, text, or video.

20. The apparatus of claim 13, wherein the outgoing message parameter instructs the message platform to retrieve an outgoing message.

* * * * *